US008817320B2

(12) United States Patent
Shirasaki et al.

(10) Patent No.: US 8,817,320 B2
(45) Date of Patent: Aug. 26, 2014

(54) LINE-HEAD CONTROL DEVICE, IMAGE FORMING APPARATUS, AND LINE-HEAD CONTROL METHOD

(75) Inventors: Yoshinori Shirasaki, Osaka (JP); Izumi Kinoshita, Hyogo (JP); Kunihiro Komai, Osaka (JP); Tatsuya Miyadera, Osaka (JP); Takeshi Shikama, Osaka (JP); Takuhei Yokoyama, Osaka (JP); Akinori Yamaguchi, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 240 days.

(21) Appl. No.: 13/300,834

(22) Filed: Nov. 21, 2011

(65) Prior Publication Data
US 2012/0154827 A1 Jun. 21, 2012

(30) Foreign Application Priority Data
Dec. 17, 2010 (JP) ................. 2010-281576

(51) Int. Cl.
*G06F 15/00* (2006.01)
*G06K 15/12* (2006.01)
*G06K 15/02* (2006.01)

(52) U.S. Cl.
CPC ........ *G06K 15/1247* (2013.01); *G06K 15/1223* (2013.01); *G06K 15/1868* (2013.01)
USPC .............................. 358/1.2; 358/3.26; 347/15

(58) Field of Classification Search
USPC ........................................................... 358/1.2
See application file for complete search history.

(56) References Cited

U.S. PATENT DOCUMENTS

2007/0120939 A1* 5/2007 Arai et al. ...................... 347/132
2010/0214341 A1* 8/2010 Li et al. ............................ 347/15
2011/0228029 A1 9/2011 Miyadera et al.

FOREIGN PATENT DOCUMENTS

JP 6-227037 8/1994
JP 2007-144731 6/2007

* cited by examiner

*Primary Examiner* — Steven Kau
*Assistant Examiner* — Andrew H Lam
(74) *Attorney, Agent, or Firm* — Oblon, Spivak, McClelland, Maier & Neustadt, L.L.P.

(57) ABSTRACT

A line-head control device that controls a line head includes: a calculation unit that divides image data into a plurality of areas in sub-scanning direction and calculates a printing percentage for each of the areas; an allocation unit that allocates a total correction amount, for correcting magnification of the image data in the sub-scanning direction, to the areas according to the printing percentage for each of the areas calculated by the calculation unit; and a control unit that changes an emission period of the light emitted from the line head so as to satisfy a partial correction amount that is an allocation of the total correction amount to each of the areas, exposes the image carrier to the light emitted from the line head with the changed light emission period, thereby causing a latent image to be formed on the image carrier based on the image data.

9 Claims, 13 Drawing Sheets

|  | PRINTING PERCENTAGE [$d_n$] |
|---|---|
| FIRST AREA | 12% |
| SECOND AREA | 30% |
| THIRD AREA | 25% |
| FOURTH AREA | 3% |
| FIFTH AREA | 22% |
| SIXTH AREA | 10% |
| SEVENTH AREA | 5% |
| EIGHTH AREA | 2% |

FIG.6

| PRINTING PERCENTAGE | PARTIAL-CORRECTION-AMOUNT CALCULATION COEFFICIENT |
|---|---|
| 0% | 10 |
| 1 TO 3% | 9 |
| 4 TO 6% | 8 |
| 7 TO 10% | 7 |
| 11 TO 15% | 4 |
| 16 TO 20% | 3 |
| 21 TO 30% | 2 |
| 30% OR MORE | 1 |

FIG.7

| | PRINTING PERCENTAGE [$d_n$] | PARTIAL-CORRECTION-AMOUNT CALCULATION COEFFICIENT [$k_n$] | PARTIAL CORRECTION AMOUNT [$h_n$] |
|---|---|---|---|
| FIRST AREA | 12% | 4 | 0.20% |
| SECOND AREA | 30% | 1 | 0.05% |
| THIRD AREA | 25% | 2 | 0.10% |
| FOURTH AREA | 3% | 9 | 0.44% |
| FIFTH AREA | 22% | 2 | 0.10% |
| SIXTH AREA | 10% | 7 | 0.34% |
| SEVENTH AREA | 5% | 7 | 0.34% |
| EIGHTH AREA | 2% | 9 | 0.44% |

| | PRINTING PERCENTAGE [$d_n$] | RANK | PRINTING RATIO [$q_n$] | PARTIAL CORRECTION AMOUNT [$h_n$] |
|---|---|---|---|---|
| FIRST AREA | 12% | 4 | 0.110 | 0.18% |
| SECOND AREA | 30% | 1 | 0.275 | 0.04% |
| THIRD AREA | 25% | 2 | 0.229 | 0.06% |
| FOURTH AREA | 3% | 7 | 0.028 | 0.46% |
| FIFTH AREA | 22% | 3 | 0.202 | 0.09% |
| SIXTH AREA | 10% | 5 | 0.092 | 0.22% |
| SEVENTH AREA | 5% | 6 | 0.046 | 0.40% |
| EIGHTH AREA | 2% | 8 | 0.018 | 0.55% |

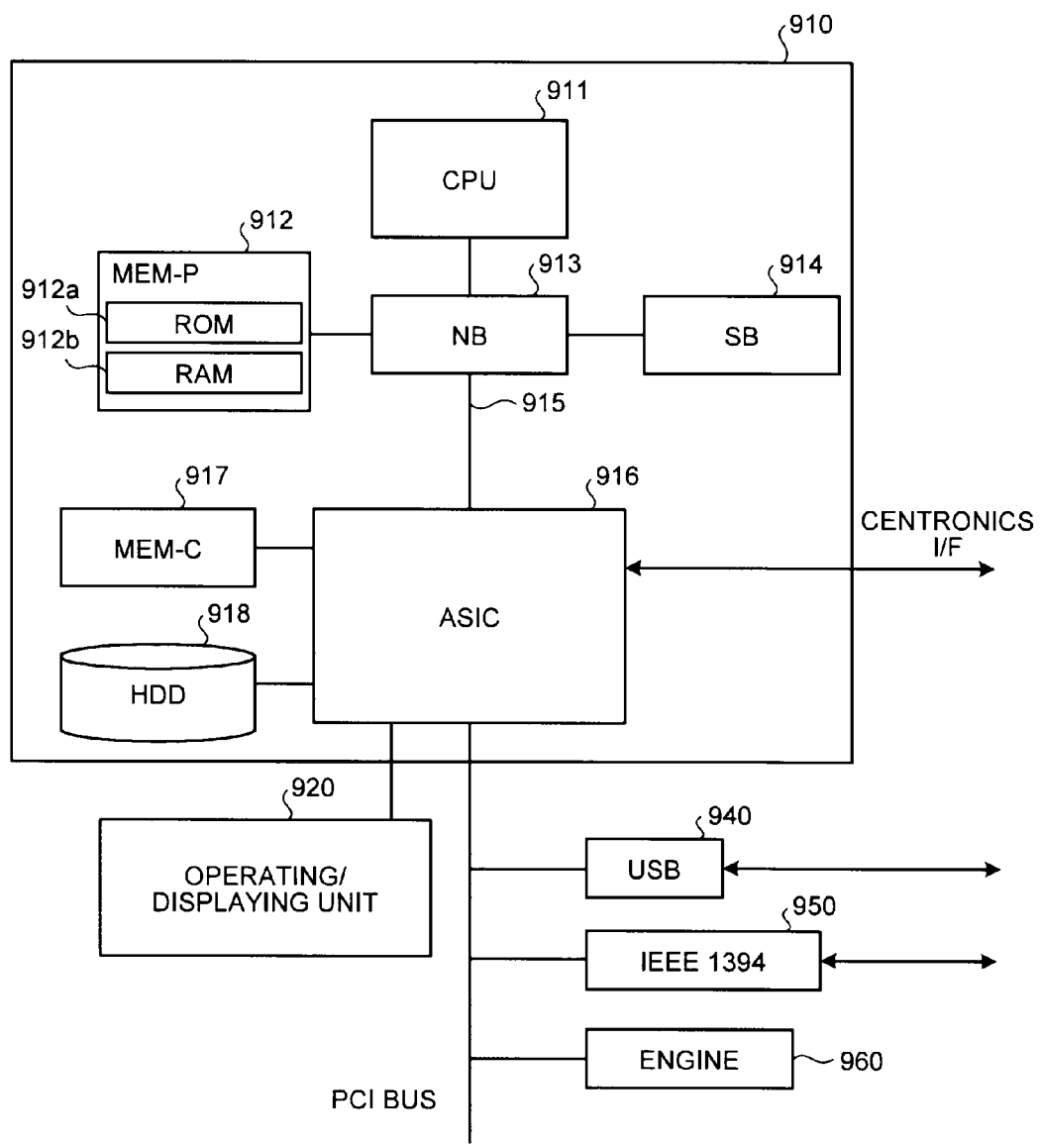

LINE-HEAD CONTROL DEVICE, IMAGE FORMING APPARATUS, AND LINE-HEAD CONTROL METHOD

CROSS-REFERENCE TO RELATED APPLICATIONS

The present application claims priority to and incorporates by reference the entire contents of Japanese Patent Application No. 2010-281576 filed in Japan on Dec. 17, 2010.

BACKGROUND OF THE INVENTION

1. Field of the Invention

The present invention relates to line-head control devices, image forming apparatuses, and line-head control methods.

2. Description of the Related Art

An image formed on a recording sheet by an image forming apparatus, such as a printing apparatus, can have variations in the magnification (a length from starting point of writing to an end point of writing) in the sub-scanning direction (sheet conveying direction). For instance, when a light emitting diode array (LEDA) is used as a line head that exposes an image carrier, mismatch between a light emission period of the LEDA and a linear velocity of a photosensitive element, or the like, can be a main cause of the magnification variation in the sub-scanning direction.

A technique for correcting the magnification variation in the sub-scanning direction by changing a light emission period of the LEDA is disclosed in, for instance, Japanese Patent Application Laid-open No. 2007-144731.

However, a conventional technique as that described above is disadvantageous in that an image density undesirably varies according to printing percentage of an image.

SUMMARY OF THE INVENTION

It is an object of the present invention to at least partially solve the problems in the conventional technology.

A line-head control device that controls a line head includes: a calculation unit that divides image data into a plurality of areas in sub-scanning direction and calculates a printing percentage for each of the areas; an allocation unit that allocates a total correction amount, that is a correction amount for correcting magnification of the image data in the sub-scanning direction, to the areas according to the printing percentage for each of the areas calculated by the calculation unit; and a control unit that changes an emission period of the light emitted from the line head so as to satisfy a partial correction amount that is an allocation of the total correction amount to each of the areas, exposes the image carrier to the light emitted from the line head with the changed light emission period, thereby causing a latent image to be formed on the image carrier based on the image data.

An image forming apparatus includes: a line-head control device that includes: a calculation unit that divides image data into a plurality of areas in sub-scanning direction and calculates a printing percentage for each of the areas; an allocation unit that allocates a total correction amount, that is a correction amount for correcting magnification of the image data in the sub-scanning direction, to the areas according to the printing percentage for each of the areas calculated by the calculation unit; a line head including an array of a plurality of light sources; an image carrier; an exposure unit that exposes the image carrier to light emitted from the line head; and a control unit that changes an emission period of the light emitted from the line head so as to satisfy a partial correction amount, that is an allocation of the total correction amount to each of the areas, exposes the image carrier to the light emitted from the line head with the changed light emission period, thereby causing a latent image to be formed on the image carrier based on the image data.

A line-head control method that controls a line head includes: calculating, by a calculation unit, a printing percentage of each of a plurality of areas, into which image data is divided in sub-scanning direction by the calculation unit; allocating, by an allocation unit, a total correction amount, that is a correction amount for correcting magnification of the image data in the sub-scanning direction, to the areas according to each of the printing ratios calculated by the calculation unit; and controlling, by a control unit, to change a light emission period of the light emitted by the line head in each of the areas so as to satisfy a partial correction amount that is an allocation amount to the corresponding area, to cause an image carrier to be exposed to the light emitted by the line head with the changed light emission period, and to cause a latent image to be formed on the image carrier based on the image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an exemplary table;

FIG. 7 is a diagram illustrating partial-correction-amount calculation coefficients allotted to the first area to the eighth area and a result of allocation of partial correction amounts to the first area to the eighth area;

FIG. 17 is a block diagram illustrating an exemplary hardware configuration of the printing apparatus according to the embodiments and the modifications.

DETAILED DESCRIPTION OF THE PREFERRED EMBODIMENTS

Exemplary embodiments of a line-head control device, an image forming apparatus, and a line-head control method are described in detail below with reference to the accompanying drawings. Although the embodiments are described by way of examples, in each of which an image forming apparatus is applied to an electrophotographic image forming apparatus, the present invention is not limited thereto. The image forming apparatus of the present invention is applicable to any apparatus that performs electrophotographic image forming such as a copying machine or a multifunction peripheral (MFP) that includes an electrophotographic image forming unit. Meanwhile, an MFP is an apparatus that has at least two functions of a printing function, a copying function, a scanner function, and a facsimile function.

First Embodiment

The configuration of a printing system including a printing apparatus according to a first embodiment will be described below.

Figure 1:
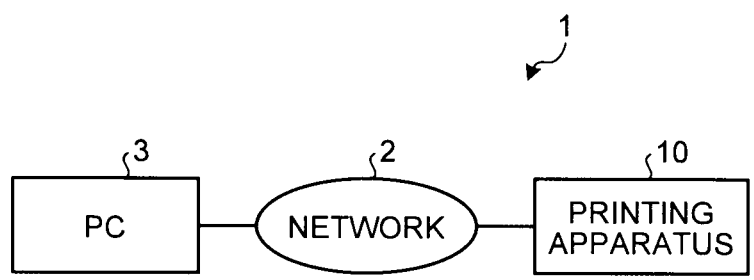
FIG. 1 is a block diagram illustrating an exemplary configuration of a printing system including a printing apparatus according to a first embodiment.

FIG. 1 is a block diagram illustrating an exemplary configuration of a printing system 1 including a printing apparatus 10 according to the first embodiment. As illustrated in FIG. 1, the printing system 1 includes a personal computer (PC) 3 and the printing apparatus 10. The PC 3 and the printing apparatus 10 are connected to each other over a network 2. The network 2 can be implemented by a local area network (LAN) or the Internet and can be any one of a wired network and a wireless network.

The PC 3 generates print data of an image to be printed and transmits the generated print data to the printing apparatus 10 over the network 2. The print data is described in, for instance, a page description language (PDL).

The printing apparatus 10 generates image data based on the print data transmitted from the PC 3 and prints an image based on the generated image data on a recording medium, such as a recording sheet.

Figure 2:
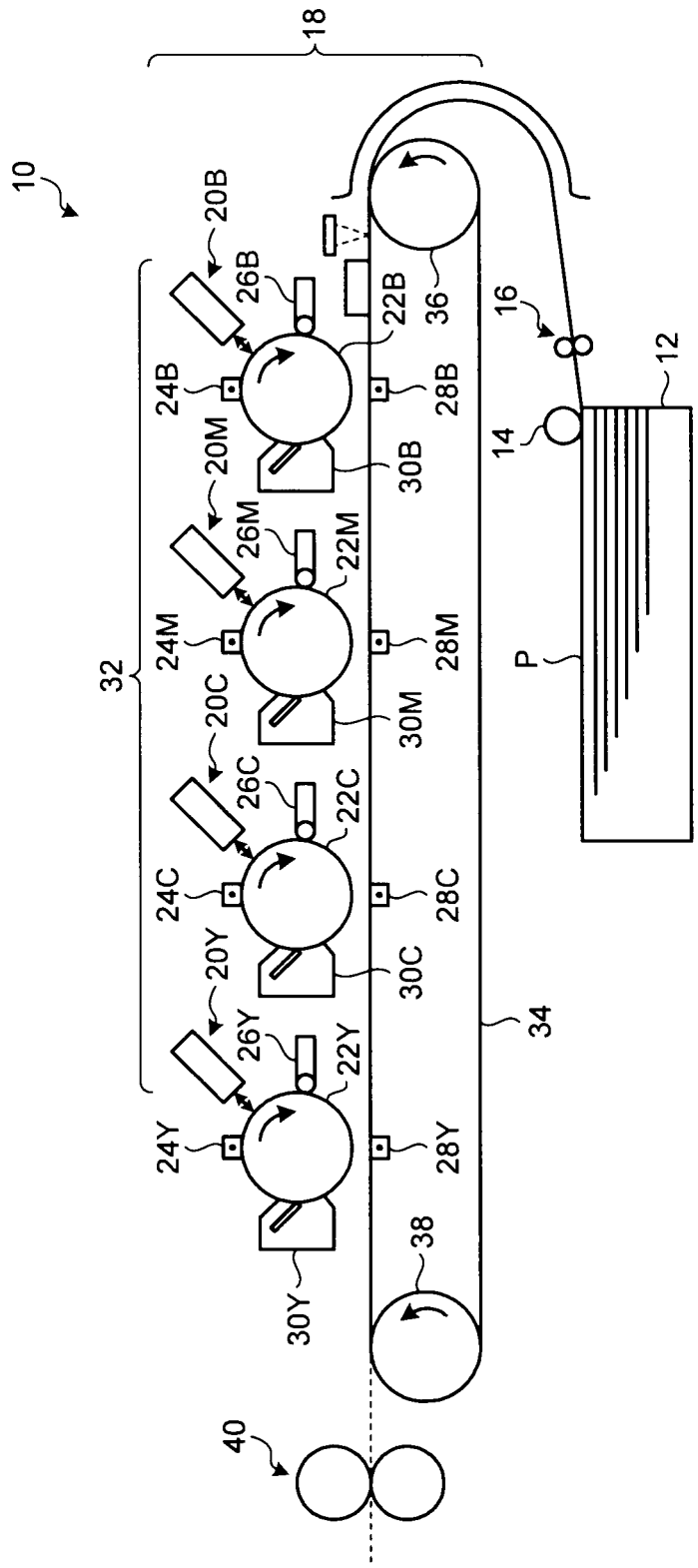
FIG. 2 is a schematic diagram illustrating an exemplary mechanical configuration of the printing apparatus according to the first embodiment.

FIG. 2 is a schematic diagram illustrating an exemplary mechanical configuration of the printing apparatus 10 according to the first embodiment. As illustrated in FIG. 2, the printing apparatus 10 includes a paper feed tray 12, a paper feed roller 14, a pair of separating rollers 16, an image forming portion 18, and a fixing unit 40. Depicted in the example illustrated in FIG. 2 is so-called a tandem printing apparatus, in which, as will be described later, an image forming unit for each color is arranged along a conveying belt; however, a printing apparatus of the embodiment is not limited thereto.

A plurality of recording sheets are placed on the paper feed tray 12 in a stacked manner.

The paper feed roller 14 is in contact with a recording sheet P, which is a topmost sheet placed on the paper feed tray 12, and feeds the recording sheet P with which the paper feed roller 14 is in contact.

The pair of separating rollers 16 delivers the recording sheet P fed by the paper feed roller 14 to the image forming portion 18. When two or more recording sheets are fed by the paper feed roller 14, the pair of separating rollers 16 pushes back each of the recording sheets other than the recording sheet P, thereby separating the recording sheet P from the each of the recording sheets other than the recording sheet P and delivering only the recording sheet P to the image forming portion 18.

The image forming portion 18 forms an image on the recording sheet P fed by the pair of separating rollers 16. The image forming portion 18 includes image four forming units, 20B (B for Black), 20M (M for Magenta), 20C (C for Cyan), and 20Y (Y for Yellow), an LEDA head 32, a conveying belt 34, a driving roller 36, and a driven roller 38.

The image forming units 20B, 20M, 20C, and 20Y are arranged in this order along the conveying belt 34 from an upstream side in a conveying direction of the conveying belt 34 that conveys the recording sheet P fed from the pair of separating rollers 16.

The image forming unit 20B includes a photosensitive element 22B. The image forming unit 20B also includes a charging unit 24B, a developing unit 26B, a transfer unit 28B, a photosensitive-element cleaner (not shown), and a neutralization unit 30B arranged around the photosensitive element 22B. The image forming unit 20B and the LEDA head 32 perform, on the photosensitive element 22B, an image forming process (an electrostatic charging process, an exposure process, a developing process, a transfer process, a cleaning process, and a neutralization process) to thereby form a black toner image on the photosensitive element 22B.

Each of the image forming units 20M, 20C, and 20Y has same configuration members as those of the image forming unit 20B. The image forming unit 20M performs an image forming process, thereby forming a magenta toner image. The image forming unit 20C performs an image forming process, thereby forming a cyan toner image. The image forming unit 20Y performs an image forming process, thereby forming a yellow toner image. Hence, descriptions mainly about the configuration members of the image forming unit 20B are provided below. Corresponding ones for the reference symbols M, C, and Y are contained in reference symbols assigned to the configuration members of the image forming units 20M, 20C, and 20Y in place of B contained in reference symbols assigned to the configuration members of the image forming unit 20B, and descriptions about the configuration members of the image forming units 20M, 20C, and 20Y are omitted.

The photosensitive element 22B (an example of the image carrier) is rotated by a driving motor (not shown).

First, in the electrostatic charging process, the charging unit 24B charges electrostatically and uniformly an outer peripheral surface of the photosensitive element 22B in a dark condition while the photosensitive element 22B is rotated.

Subsequently, in the exposure process, the LEDA head 32 (an example of the line head) exposes the outer peripheral surface of the photosensitive element 22B that is rotated to light corresponding to the black image so as to form an electrostatic latent image corresponding to the black image on the photosensitive element 22B. Meanwhile, the LEDA head 32 exposes an outer peripheral surface of a photosensitive element 22M to light corresponding to the magenta image, an outer peripheral surface of a photosensitive element 22C to light corresponding to the cyan image, and an outer peripheral surface of a photosensitive element 22Y to light corresponding to the yellow image.

Subsequently, in the developing process, the developing unit 26B develops the electrostatic latent image formed on the photosensitive element 22B with black toner to form a black toner image on the photosensitive element 22B.

Subsequently, in the transfer process, the transfer unit 28B transfers the black toner image formed on the photosensitive element 22B onto the recording sheet P at a transfer position where the photosensitive element 22B comes into contact with the recording sheet P conveyed by the conveying belt 34. Meanwhile, even after the toner image has been transferred, there remains, on the photosensitive element 22B, a small amount of toner that has not been transferred onto the recording sheet P.

Subsequently, in the cleaning process, the photosensitive-element cleaner wipes off the non-transferred toner remaining on the photosensitive element 22B.

Finally, in the neutralization process, the neutralization unit 30B neutralizes residual potential on the photosensitive element 22B. The image forming unit 20B then waits for next image formation.

The conveying belt 34 is an endless belt wound around the driving roller 36 and the driven roller 38. The recording sheet P fed from the pair of separating rollers 16 is attracted to the conveying belt 34 by an action of electrostatic attraction. The conveying belt 34 is endlessly rotated by the driving roller 36 that is rotated by the driving motor (not shown) to convey the recording sheet P attracted thereto to the image forming units 20B, 20M, 20C, and 20Y in this order.

Onto the recording sheet P conveyed by the conveying belt 34, the image forming unit 20B transfers the black toner image first. Subsequently, the image forming unit 20M transfers the magenta toner image onto the black toner image, onto which the cyan toner image is transferred by the image forming unit 20C, and the yellow toner image is transferred by the image forming unit 20Y in a superimposing manner. As a result, a full-color image is formed on the recording sheet P.

The fixing unit 40 applies heat and pressure onto the recording sheet P having been separated from the conveying belt 34, thereby fixing the full-color image formed by the image forming units 20B, 20M, 20C, and 20Y onto the recording sheet P. The recording sheet P, onto which the image has been fixed, is discharged from the printing apparatus 10.

Figure 3:
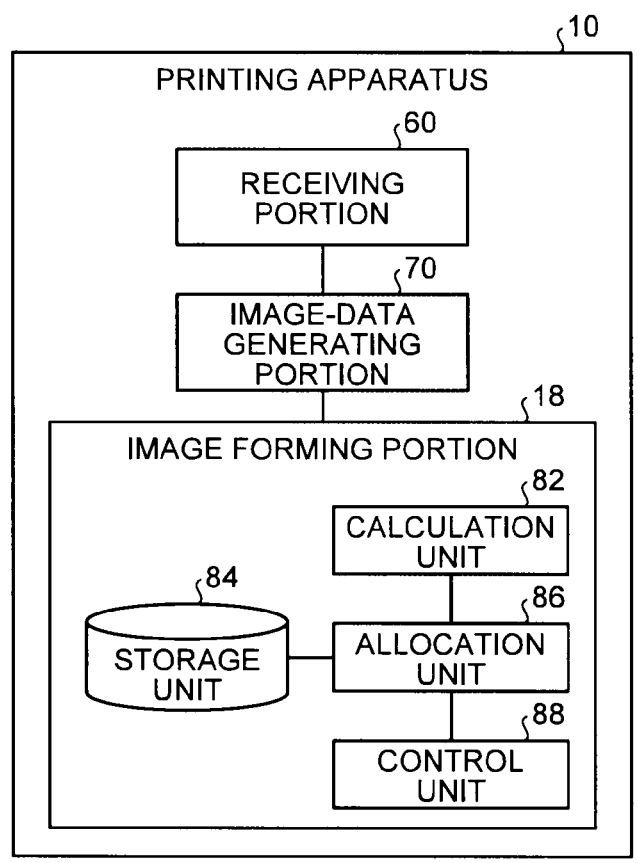
FIG. 3 is a block diagram illustrating an exemplary functional configuration of the printing apparatus according to the first embodiment.

FIG. 3 is a block diagram illustrating an exemplary functional configuration of the printing apparatus 10 according to the first embodiment. As illustrated in FIG. 3, the printing apparatus 10 includes a receiving portion 60, an image-data generating portion 70, and the image forming portion 18.

The receiving portion 60 carries out communications with external equipment, such as the PC 3, over the network 2. The receiving portion 60 can be implemented by an existing communication device, such as a network interface card (NIC). The receiving portion 60 receives print data from, for instance, the PC 3.

The image-data generating portion 70 generates image data based on the print data received by the receiving portion 60. The image-data generating portion 70 can be implemented by a controller including an image processing application specific integrated circuit (ASIC) or a central processing unit (CPU).

The image forming portion 18 forms an image based on the image data generated by the image-data generating portion 70 on a recording sheet. The image forming portion 18 includes a calculation unit 82, a storage unit 84, an allocation unit 86, and a control unit 88. In the first embodiment, descriptions are made on an assumption that processing to be performed by the calculation unit 82 and the allocation unit 86 are implemented via software that runs on the CPU, while control operations to be performed by the control unit 88 is implemented via hardware; however, an implementation of an embodiment is not limited thereto.

The calculation unit 82 divides the image data generated by the image-data generating portion 70 into a plurality of areas in the sub-scanning direction (sheet conveying direction), and calculates a printing percentage of each of the areas. The printing percentage is a ratio of black data to total data in the area.

Figures 4, 5:
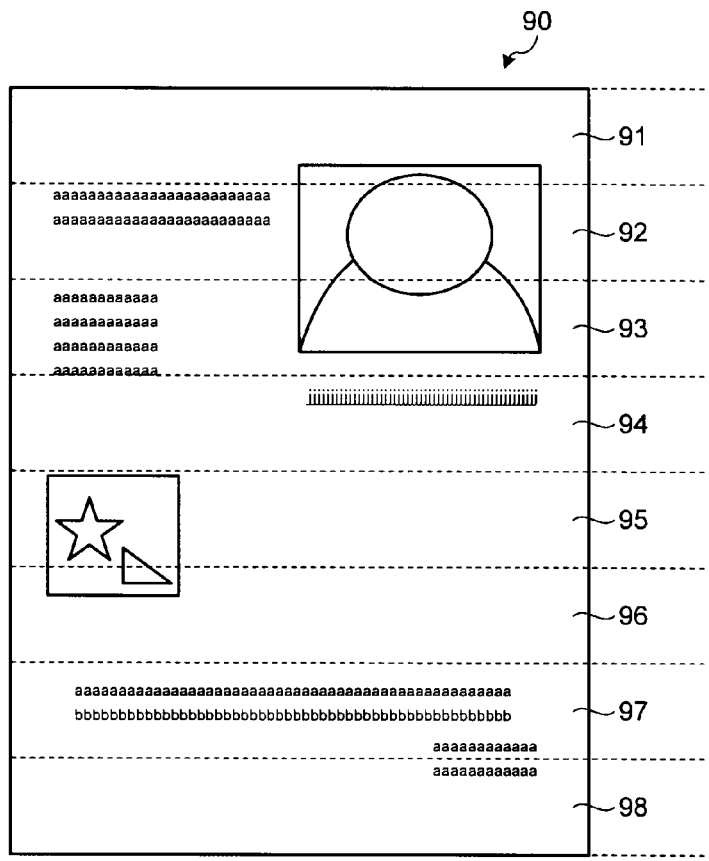
FIG. 4 is a diagram illustrating an exemplary division of image data.
FIG. 5 is a diagram illustrating an exemplary calculation result of printing percentages of first area to eighth area.

FIG. 4 is a diagram illustrating an exemplary division of image data 90. In the example illustrated in FIG. 4, the calculation unit 82 equally divides the image data 90 in the sub-scanning direction into eight areas, a first area 91 to an eighth area 98. The calculation unit 82 calculates printing percentages $d_1$ to $d_8$ of the first area 91 to the eighth area 98, respectively, by using Equation (1).

$$d_n = \text{(the number of black data pieces in the nth area/} \\ \text{the number of total data pieces in the nth area)} \times 100 \quad (1)$$

In this expression, n is a natural number less than or equal to the number of the areas. In the example illustrated in FIG. 4, n is a natural number less than or equal to 8.

FIG. 5 is a diagram illustrating a calculation result of the printing percentages $d_1$ to $d_8$ of the first area 91 to the eighth area 98. As seen in FIG. 5, dividing image data into a plurality of areas can cause a variation in the printing percentages among the areas.

The storage unit 84 can be implemented by, for instance, an existing magnetically, optically, or electrically storable storage device, such as a read only memory (ROM), a random access memory (RAM), a memory card, a hard disk drive (HDD), a solid state drive (SSD), or an optical disk. The storage unit 84 stores a table including a total correction amount, which is a correction amount for correcting magnification (the length from a starting point of writing to an end point of writing) of the image data in the sub-scanning direction, or a table including coefficients that decrease stepwise, for each of the printing percentages, as the printing percentages increase.

FIG. 6 is a diagram illustrating an example of the table stored in the storage unit 84. In the table illustrated in FIG. 6, partial-correction-amount calculation coefficients are associated with printing percentage that are classified stepwise such that the partial-correction-amount calculation coefficient decreases as the printing percentage increases.

The allocation unit 86 allocates a total correction amount to the areas based on the printing percentages each of which has been calculated by the calculation unit 82. More specifically, the allocation unit 86 allocates the total correction amount to the areas according to ratios corresponding to the printing percentages calculated by the calculation unit 82.

For instance, the allocation unit 86 determines partial-correction-amount calculation coefficients $k_1$ to $k_8$ that correspond to the printing percentages $d_1$ to $d_8$, respectively, by referring to the table, illustrated in FIG. 6, that is stored in the storage unit 84. The allocation unit 86 allots the thus-determined partial-correction-amount calculation coefficients $k_1$ to $k_8$, respectively, to the first area 91 to the eighth area 98. The allocation unit 86 then calculates partial correction amounts $h_1$ to $h_8$, which are allocations of a total correction amount m, to the first area 91 to the eighth area 98 calculated by using Equation (2), and allocates the calculated partial correction amounts $h_1$ to $h_8$, respectively, to the first area 91 to the eighth area 98.

$$h_n = k_n / k_{all} \times m \quad (2)$$

In this expression, $k_{all}$, a total value of partial-correction-amount calculation coefficients, is a total value of the partial-correction-amount calculation coefficients $k_n$. In the example illustrated in FIG. 4 and FIG. 5, $k_{all}$ is a total value of the partial-correction-amount calculation coefficients $k_1$ to $k_8$. In the first embodiment, a value of $h_n$ is represented after rounded off to the third decimal place; however, no limitation thereto is intended.

For instance, when the total correction amount m is 2.0%, $h_1$, the partial correction amount for the first area 91, is obtained from Equation (2) as follows: $h_1=k_1/k_{all} \times m = 4/41 \times 2.0 = 0.20$. Similarly, $h_2$, the partial correction amount for the second area 92, to $h_8$, the partial correction amount for the eighth area 98, can be obtained from Equation (2).

FIG. 7 is a diagram illustrating $k_1$ to $k_8$, the partial-correction-amount calculation coefficients allotted to the first area 91 to the eighth area 98, and a result of allocation of $h_1$ to $h_8$, the partial correction amounts, to the first area 91 to the eighth area 98 in a case where the total correction amount m is 2.0%. Note that a total value of the partial correction amounts $h_1$ to $h_8$ is 2.0%, which is the value of the total correction amount m.

The control unit 88 changes a light emission period for each of the areas, into which the image data is divided by the calculation unit 82, to a changed light emission period that satisfies the partial correction amount allocated to the area by the allocation unit 86 and causes the LEDA head 32 to expose the photosensitive element 22B to light according to the changed light emission period to cause a latent image to be formed on the photosensitive element 22B based on the image data. A latent image based on the image data is formed on each of the photosensitive elements 22M, 22C, and 22Y by a similar process.

More specifically, the control unit 88 generates a light-emission-period signal that instructs the LEDA head 32 to emit a light so as to satisfy the partial correction amount allocated to each of the areas and transmits the light-emission-period signal to the LEDA head 32. Upon receiving the light-emission-period signal from the control unit 88, the LEDA head 32 emits light that illuminates the photosensitive element 22B for exposure.

Figure 8:
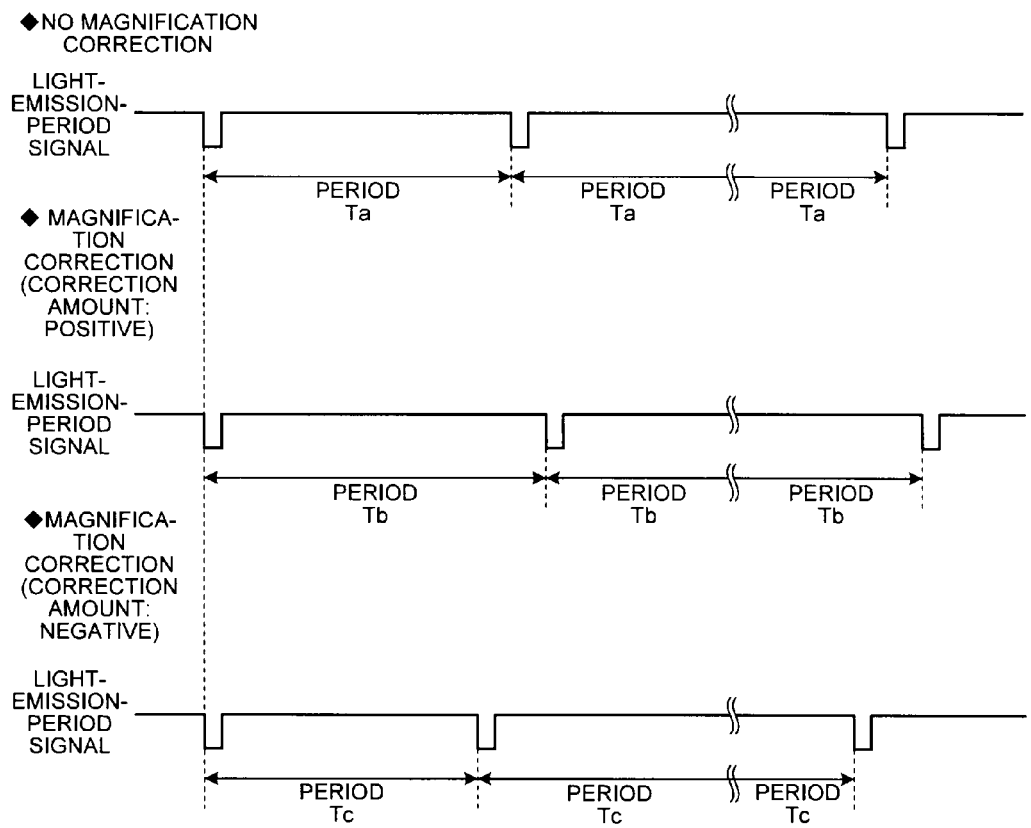
FIG. 8 is an explanatory diagram illustrating an exemplary signal generation with a light emission period.

FIG. 8 is an explanatory diagram illustrating an exemplary generated light-emission-period signal. As illustrated in FIG. 8, when the partial correction amount has a positive value (greater than zero), the control unit 88 generates a light-emission-period signal designating a period Tb, which is longer than a period Ta designated by a regular light-emission-period signal. When the partial correction amount has a negative value (smaller than zero), the control unit 88 generates a light-emission-period signal designating a period Tc, which is shorter than the period Ta designated by the regular light-emission-period signal. In this way, the control unit 88 changes a line period in each of the areas so as to satisfy the partial correction amount.

Meanwhile, the control unit 88 may change the period designated by the light-emission-period signal in the area either evenly or at a predetermined interval. For instance, in a case where an absolute value of a partial correction amount is smaller than a threshold value, changing the period designated by the light-emission-period signal evenly in the area (more specifically, all lines across the area) can suppress an influence of the correction on image density more greatly. For another instance, in a case where an absolute value of a partial correction amount is greater than the threshold value, changing the period designated by the light-emission-period signal in the area (more specifically, all lines across the area) at a predetermined interval can suppress an influence of the correction on image density more greatly.

Changing the period designated by the light-emission-period signal can be achieved by, for instance, forcibly increasing or clearing a value of a counter, which is a basis for generating the light-emission-period signal, at timing when the value reaches a target period (period that satisfies the partial correction amount).

Operations of the printing apparatus according to the first embodiment will be described below.

Figure 9:
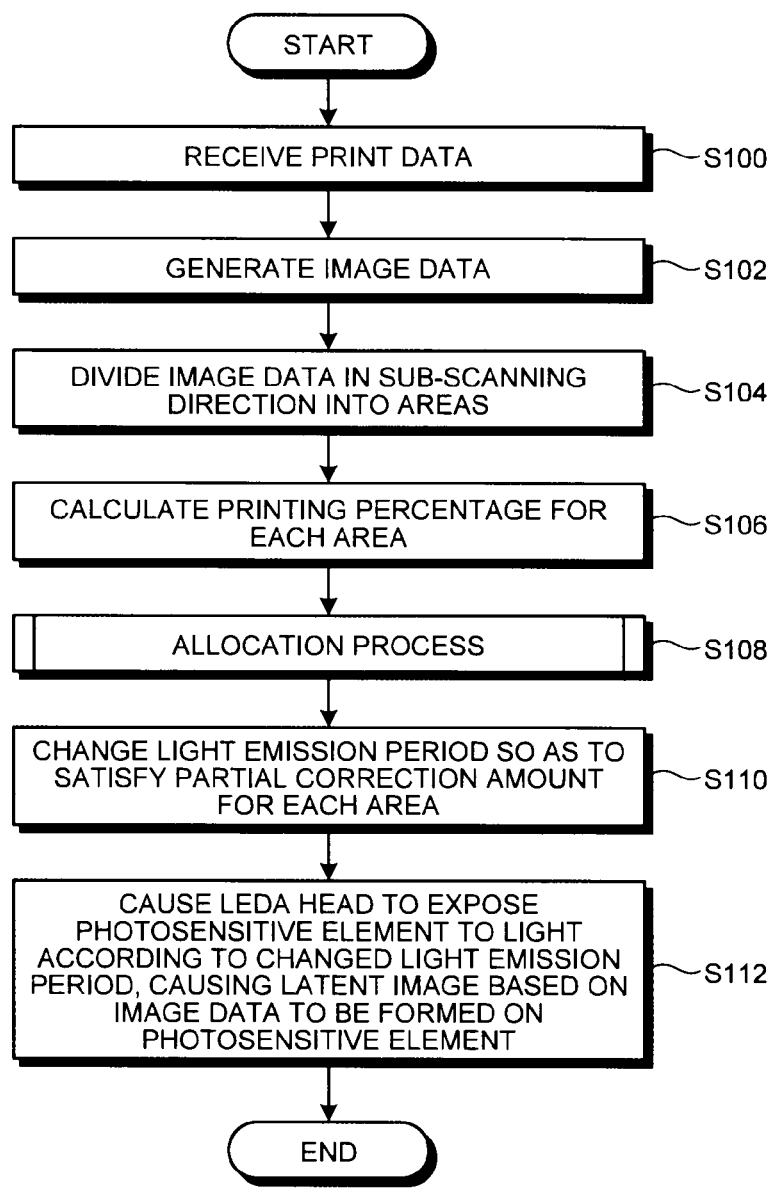
FIG. 9 is a flowchart for an exemplary LEDA head control process to be performed by the printing apparatus according to the first embodiment.

FIG. 9 is a flowchart for an exemplary LEDA head control process to be performed by the printing apparatus 10 according to the first embodiment. A process for controlling the LEDA head 32 to form a latent image on the photosensitive element 22B is described with reference to the flowchart illustrated in FIG. 9. A similar process is to be performed to form a latent image on each of the photosensitive elements 22M, 22C, and 22Y.

First, the receiving portion 60 receives print data from the PC 3 (Step S100).

Subsequently, the image-data generating portion 70 generates image data based on the print data received by the receiving portion 60 (Step S102).

Subsequently, the calculation unit 82 divides the image data generated by the image-data generating portion 70 into a plurality of areas in the sub-scanning direction (Step S104).

Subsequently, the calculation unit 82 calculates a printing percentage of each of the areas (Step S106).

Subsequently, the allocation unit 86 performs an allocation process for allocating a total correction amount to the areas based on the printing percentages calculated by the calculation unit 82 (Step S108). The allocation process will be described in detail later.

Subsequently, the control unit 88 changes, for each of the areas into which the image data is divide by the calculation unit 82, a light emission period so as to satisfy the partial correction amount allocated by the allocation unit 86 (Step S110).

Subsequently, the control unit 88 causes the LEDA head 32 to expose the photosensitive element 22B to light according to the changed light emission period, thereby causing a latent image to be formed on the photosensitive element 22B based on the image data (Step S112).

Figure 10:
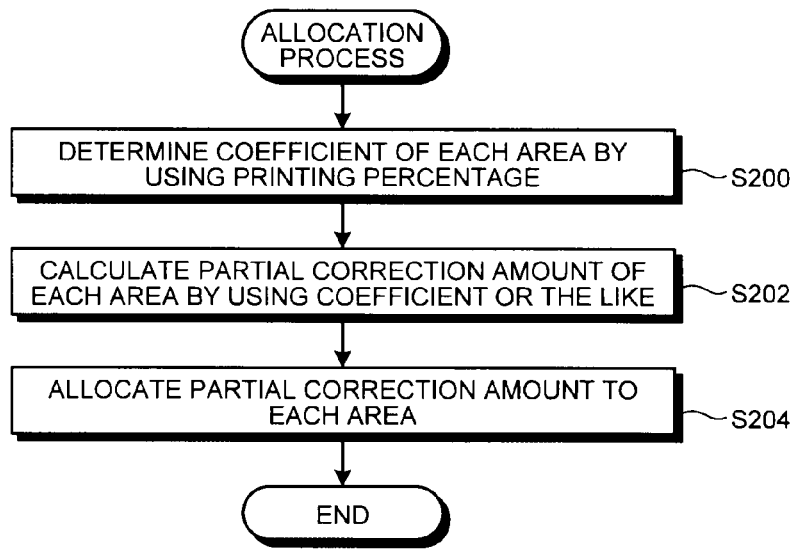
FIG. 10 is a flowchart for an exemplary allocation process to be performed by the printing apparatus according to the first embodiment.

FIG. 10 is a flowchart for an exemplary allocation process to be performed at Step S108 of the flowchart illustrated in FIG. 9.

First, the allocation unit 86 refers to the table including the coefficients that are associated with the printing percentages such that the coefficient decreases stepwise as the printing percentage increases to determine, for each of the areas into which the image data is divided by the calculation unit 82, a coefficient associated with the printing percentage of the area calculated by the calculation unit 82 (Step S200).

Subsequently, the allocation unit 86 calculates, for each of the areas, a partial correction amount, which is an allocation of the total correction amount to the area, by using the determined coefficient or the like (Step S202).

Subsequently, the allocation unit 86 allocates the partial correction amounts to each of the areas (Step S204).

As described above, according to the first embodiment, the total correction amount for correcting magnification in the sub-scanning direction is allocated to each of the areas of the image data as the partial correction amount based on the printing percentage of the area, and the light emission period of the LEDA head is changed to satisfy the partial correction amount of the area. Accordingly, a discrepancy in the magnification in the sub-scanning direction can be corrected while suppressing an influence of the correction on the image density.

In particular, according to the first embodiment, the allocations (the partial correction amounts) of the total correction amount to the areas are calculated by using the table including the printing percentages that are associated with the coefficients such that the coefficient decreases stepwise as the printing percentage increases for each of the printing percentages. This allows simplifying calculations and hence suppressing processing load.

Furthermore, according to the first embodiment, preprocessing, that is necessary to control the LEDA head, including the division of the image data, the calculation of the printing percentages, and the allocation of the total correction amount, is performed by the image forming portion 70 rather than by using the image-data generating portion 18. This permits original equipment manufacturing (OEM) of the image-data generating portion (controller) or the like.

Second Embodiment

Description is given, in a second embodiment, of an example in which a plurality of areas are ranked in the order of the printing percentages; ratios dependent on the printing percentages of the corresponding areas are applied to the areas after reversing the ranks; the total correction amount is allocated to the areas with the ratios applied to the areas. In the following descriptions, differences relative to the first embodiment will be mainly described. Configuration members having similar functions to those of the first embodiment are denoted by the same names and reference numerals as in the first embodiment, and repeated descriptions are omitted.

Figure 11:
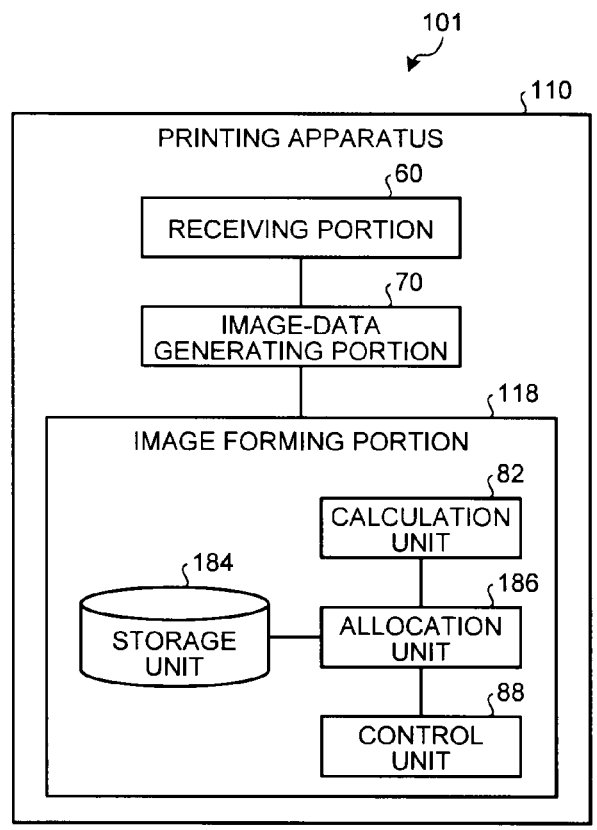
FIG. 11 is a block diagram illustrating an exemplary functional configuration of a printing apparatus according to a second embodiment.

FIG. 11 is a block diagram illustrating an exemplary functional configuration of a printing apparatus 110 according to the second embodiment. As illustrated in FIG. 11, the printing apparatus 110 of a printing system 101 differs from the first embodiment in a storage unit 184 and an allocation unit 186 of an image forming device 118.

The storage unit 184 does not store the table including the coefficients that are associated with the printing percentages for each of the printing percentages such that the coefficient decreases stepwise as the printing percentage increases but stores the total correction amount, which is the correction amount for correcting the magnification (the length from a starting point of writing to an end point of writing) of the image data in the sub-scanning direction.

The allocation unit 186 ranks the areas in the order of the printing percentages calculated by the calculation unit 82, applies ratios, each of which depends on the printing percentage of the corresponding area, to the areas with the reversed ranks, and allocates the total correction amount to the areas according to the ratios applied thereto.

For example, the allocation unit 186 ranks the first area 91 to the eighth area 98 in descending order of the printing percentages $d_1$ to $d_8$. The allocation unit 186 also calculates printing ratios $q_1$ to $q_8$ of the first area 91 to the eighth area 98, respectively, by using Equation (3):

$$q_n = d_n/d_{all} \quad (3)$$

In this expression, $d_{all}$ is a total value of the printing percentages $d_n$ (n=1 to 8). In the example illustrated in FIG. 4 and FIG. 5, $d_{all}$ denotes a total value of the printing percentages $d_1$ to $d_8$. In the second embodiment, a value of $q_n$ is represented after being rounded off to the third decimal place; however, no limitation thereto is intended.

For example, the printing ratio $q_2$ of the second area 92 that is ranked first is calculated from Equation (3) as: $q_2=d_2/d_{all}=30/109=0.275$. The printing ratio $q_8$ of the eighth area 98 ranked eighth is calculated from Equation (3) as: $q_8=d_8/d_{all}=2/109=0.018$. The printing ratios of the other areas can be calculated similarly from Equation (3).

The allocation unit 186 further applies the calculated printing ratios $q_1$ to $q_8$ to the first area 91 to the eighth area 98 with the reversed ranks. More specifically, the allocation unit 186 applies the printing ratio of the area ranked first to the area ranked eighth, the printing ratio of the area ranked second to the area ranked seventh, the printing ratio of the area ranked third to the area ranked sixth, the printing ratio of the area ranked fourth to the area ranked fifth, the printing ratio of the area ranked fifth to the area ranked fourth, the printing ratio of the area ranked sixth to the area ranked third, the printing ratio of the area ranked seventh to the area ranked second, and the printing ratio of the area ranked eighth to the area ranked first.

The allocation unit 186 then calculates the partial correction amounts $h_1$ to $h_8$, which are the allocations of the total correction amount m to the first area 91 to the eighth area 98, by using Equation (4) and allocates the calculated partial correction amounts $h_1$ to $h_8$ to the first area 91 to the eighth area 98.

$$h_n = q_l \times m \quad (4)$$

In this expression, the printing ratio $q_l$ is a printing ratio applied to the first area 91 to the eighth area 98 with the ranks of the first area 91 to the eighth area 98 reversed. Accordingly, similarly to n, l is a natural number less than or equal to the number of the areas defined by division. In the example illustrated in FIG. 4 and FIG. 5, l is a natural number less than or equal to 8.

For example, when m, the total correction amount, is 2.0%, $h_2$, the partial correction amount for the second area 92, is obtained from Equation (4) as follows: $h_2=q_8 \times m=0.018 \times 2.0=0.04$. The partial correction amount for the eighth area 98 is obtained as follows: $h_8=q_2 \times m=0.275 \times 2.0=0.55$. The partial correction amounts for the other areas can be calculated similarly from Equation (4).

Figures 12, 13:
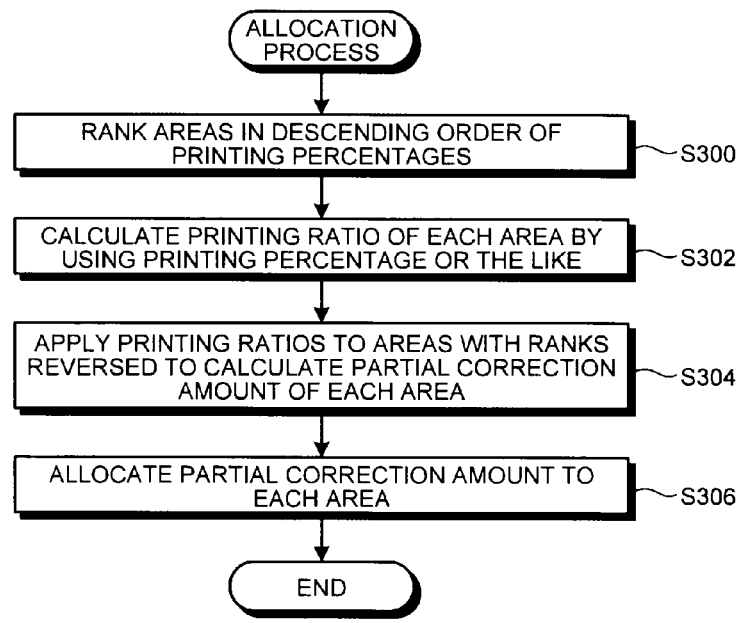
FIG. 12 is a diagram illustrating ranks and printing ratios of the first area to the eighth area and a result of allocation of partial correction amounts to the first area to the eighth area.
FIG. 13 is a flowchart illustrating an exemplary allocation process to be performed by the printing apparatus according to the second embodiment.

FIG. 12 is a diagram illustrating the ranks of the first area 91 to the eighth area 98, the printing ratios $q_1$ to $q_8$, and a result of allocation of the partial correction amounts $h_1$ to $h_8$ to the first area 91 to the eighth area 98 in a case where the total correction amount m is 2.0%. Note that a total value of the $h_1$ to $h_8$, the partial correction amounts, is 2.0%, which is the value of the total correction amount m.

FIG. 13 is a flowchart for an exemplary allocation process to be performed at Step S108 of the flowchart illustrated in FIG. 9. The process for controlling the LEDA head to be performed by the printing apparatus 110 according to the second embodiment is similar to that (the flowchart illustrated in FIG. 9) of the first embodiment.

First, the allocation unit 186 ranks the areas, into which the image data is divided by the calculation unit 82, in descending order of the print percentages calculated by the calculation unit 82 (Step S300).

Subsequently, the allocation unit 186 calculates a printing ratio of each of the areas by using the printing percentages or the like (Step S302).

Subsequently, the allocation unit 186 applies the calculated printing ratios to the areas with the reversed ranks, and calculates, for each of the areas, a partial correction amount, which is an allocation of the total correction amount to the area, by using the printing ratio applied to the area or the like (Step S304).

Subsequently, the allocation unit 186 allocates the partial correction amounts to each of the areas (Step S306).

As described above, according to the second embodiment, the allocation (the partial correction amount) of the total correction amount to each of the areas is calculated by ranking the areas according to the printing percentages and applying the ratios, each of which depends on the printing percentage of the corresponding area, to the areas with the ranks reversed. This makes it clear the correspondence between the printing percentages and the partial correction amounts and suppress an influence of the correction on an image density greatly than before.

Modifications

The present invention is not limited to the embodiments discussed above and various modifications are possible.

First Modification

For example, the first embodiment may be modified such that the image-data generating portion includes the calculation unit. In the following descriptions, differences of this first modification relative to the first embodiment will be mainly described. Configuration members similar to those of the first embodiment in function are denoted by the same names or reference numerals, and repeated descriptions will be omitted.

Figure 14:
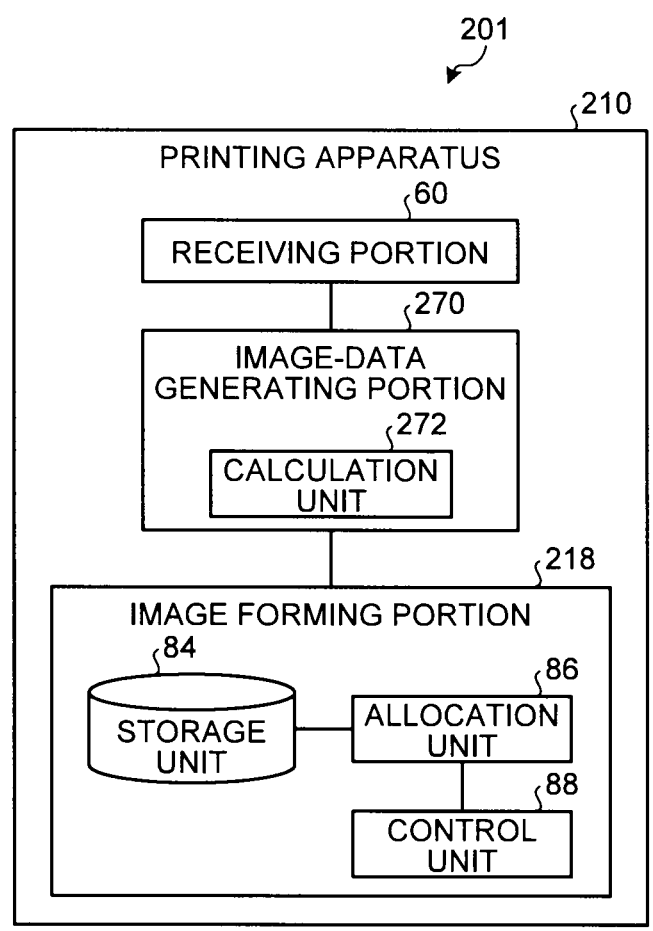
FIG. 14 is a block diagram illustrating an exemplary configuration of a printing apparatus according to a first modification.

FIG. 14 is a block diagram illustrating an exemplary configuration of a printing apparatus 210 of the first modification. As illustrated in FIG. 14, in the printing apparatus 210 of a printing system 201, an image forming portion 218 does not include a calculation unit 272 but an image-data generating portion 270 includes the calculation unit 272. Note that processing to be performed by the calculation unit 272 is similar to that of the first embodiment.

According to this modification, the image-data generating portion divides image data and calculates printing percentages, saving an amount of a memory (not shown) used in the image forming portion.

The second embodiment can also be modified similarly to the first modification.

Second Modification

In the first embodiment, for instance, the example where each of the image forming units directly forms an image on a recording sheet has been described; however, the first embodiment may be modified such that each of the image forming units forms an image on an intermediate transfer belt, from which images are to be transferred onto the recording sheet. In the following descriptions, differences of the second modification relative to the first embodiment will be mainly described. Configuration members having similar functions to those of the first embodiment are denoted by the same names and reference numerals as in the first embodiment, and repeated descriptions are omitted.

Figure 15:
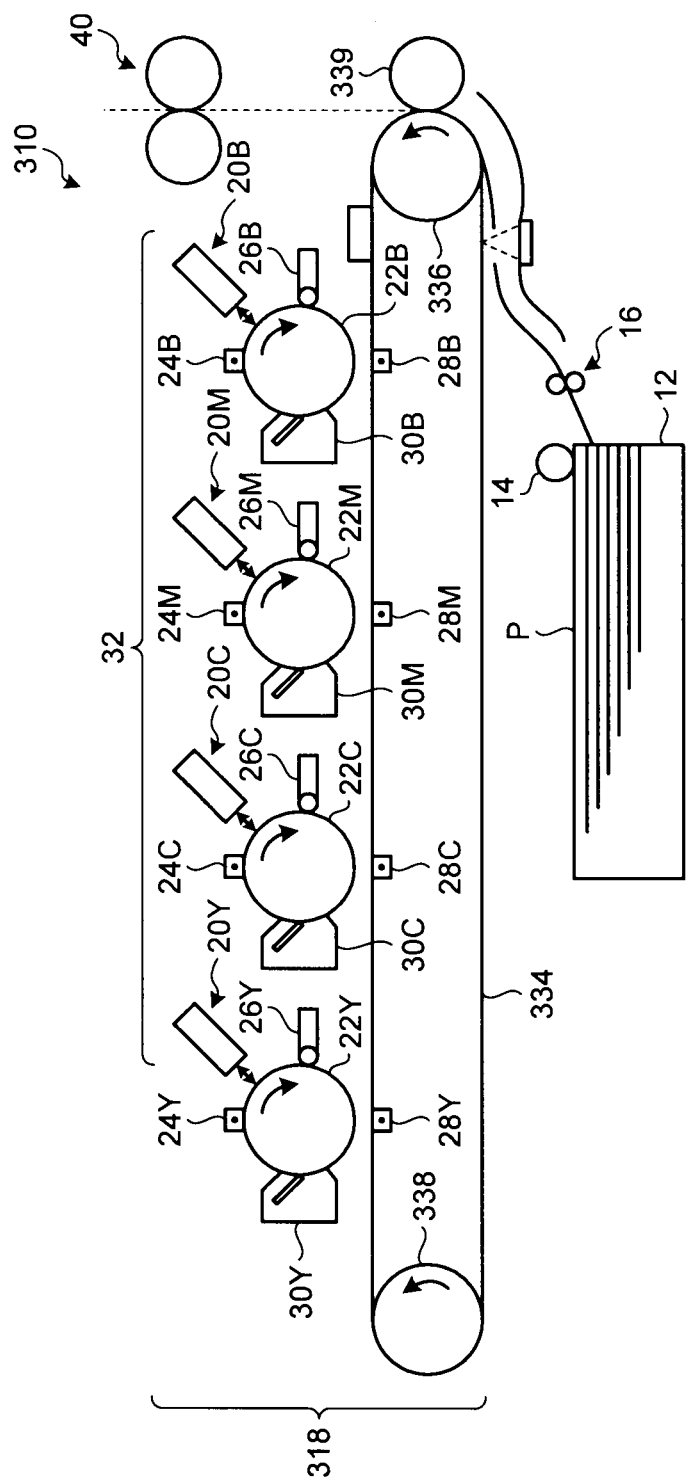
FIG. 15 is a schematic diagram illustrating an exemplary mechanical configuration of a printing apparatus according to a second modification.

FIG. 15 is a schematic diagram illustrating an exemplary mechanical configuration of a printing apparatus 310 according to the second modification. As illustrated in FIG. 15, the printing apparatus 310 differs from the first embodiment in that an image forming portion 318 includes, instead of the conveying belt 34, the driving roller 36, or the driven roller 38, an intermediate transfer belt 334, a driving roller 336, and a driven roller 338, and further includes a secondary transfer roller 339.

The intermediate transfer belt 334 is an endless belt wound around the driving roller 336 and the driven roller 338. The intermediate transfer belt 334 is endlessly rotated by the driving roller 336 that is rotated by a driving motor (not shown), thereby being endlessly moved to the image forming units 20B, 20M, 20C, and 20Y in this order.

First, the image forming unit 20B transfers a black toner image onto the intermediate transfer belt 334. Thereafter, the image forming unit 20M transfers a magenta toner image onto the black toner image, onto which a cyan toner image is subsequently transferred by the image forming unit 20C, and a yellow toner image is transferred by the image forming unit 20Y in a superimposing manner. Thus, a full-color image is formed on the intermediate transfer belt 334.

The recording sheet P is fed by the pair of separating rollers 16 onto the intermediate transfer belt 334, on which the image has been formed. The image is transferred from the intermediate transfer belt 334 onto the recording sheet P at a secondary transfer position where the intermediate transfer belt 334 comes into contact with the recording sheet P.

The secondary transfer roller 339 is provided at the secondary transfer position. The secondary transfer roller 339 presses the recording sheet P against the intermediate transfer belt 334 at the secondary transfer position, increasing efficiency in the transfer. Meanwhile, the secondary transfer roller 339 is in close contact with the intermediate transfer belt 334. A mechanism for brining the secondary transfer roller 339 toward and away from the intermediate transfer belt 334 is not provided.

The second embodiment can be modified similarly to the second modification.

Third Modification

For instance, the first embodiment and the second embodiment can be configured to repeatedly perform the division of image data, the calculation of the printing percentages, and the allocation of the correction amount. More specifically, a modification may be made such that the calculation unit further divides each of the areas, into which the image data has been divided, into a plurality of partial areas in the sub-scanning direction and calculates a printing percentage for each of the partial areas, while the allocation unit allocates the partial correction amounts to the partial areas based on the printing percentage of each of the partial areas.

Figure 16:
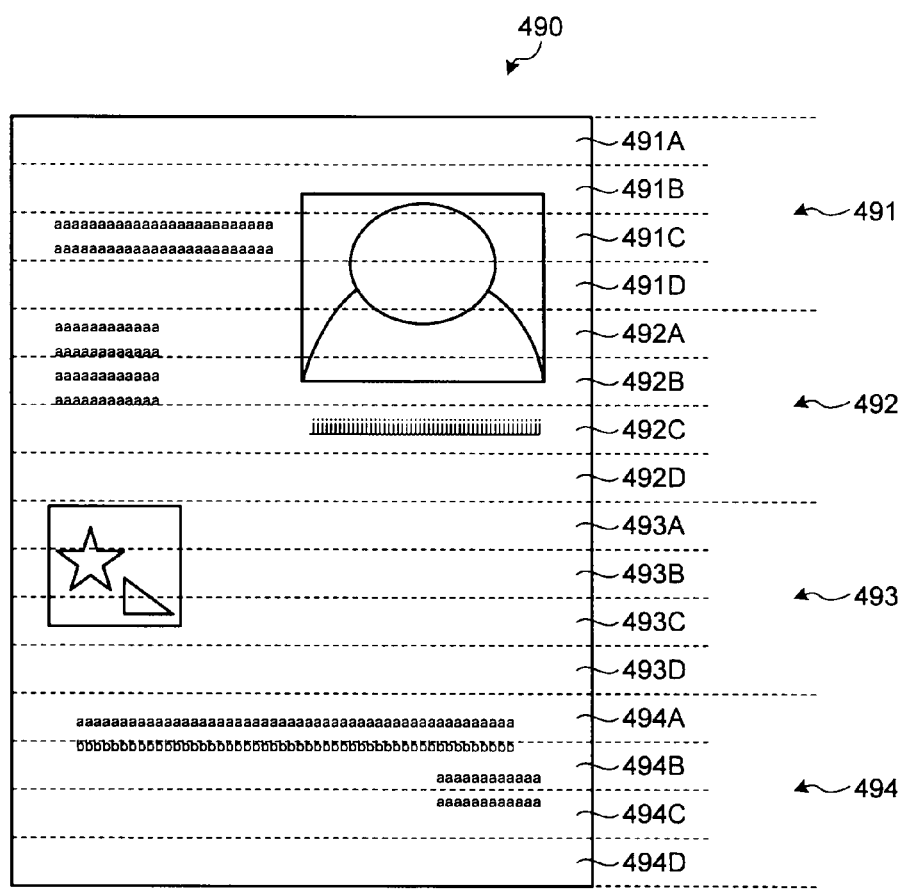
FIG. 16 is a diagram illustrating an exemplary division of image data according to a third modification.

FIG. 16 is a diagram illustrating an exemplary division of image data 490. In the example illustrated in FIG. 16, the image data 490 is equally divided in the sub-scanning direction into four areas ranging from a first area 491 to a fourth area 494. Printing percentages of the first area 491 to the fourth area 494 are calculated. A total correction amount is allocated as partial correction amounts to the four areas, i.e., the first area 491 to the fourth area 494.

From this state, the calculation unit further equally divides the first area 491 in the sub-scanning direction into first partial areas 491A to 491D, the second area 492 in the sub-scanning direction into second partial areas 492A to 492D, the third area 493 in the sub-scanning direction into third partial areas 493A to 493D, and the fourth area 494 in the sub-scanning direction into fourth partial areas 494A to 494D, and calculates a printing percentage of each of the partial areas.

The allocation unit further allocates the partial correction amount allocated to each of the areas to the partial areas based on the printing percentage of each of the partial areas. For instance, the allocation unit further allocates the partial correction amount allocated to the first area 491 to the first partial areas 491A to 491D based on the printing percentages of the first partial areas 491A to 491D of the first area 491. An allocation method can be any one of the allocation method of the first embodiment and the allocation method of the second embodiment.

This technique enables partial magnification correction in the area.

Hardware Configuration

FIG. 17 is a block diagram illustrating an exemplary hardware configuration of the printing apparatus according to the embodiments and the modifications. As illustrated in FIG. 17, the printing apparatus according to the embodiments and the modifications is configured such that a controller 910 and an engine unit (Engine) 960 are connected to each other with a peripheral component interconnect (PCI) bus. The controller 910 is a controller that controls the overall MFP, rendering, communication, and inputs entered from an operating/displaying unit 920. The engine unit 960 is a printer engine, or the like, that can be connected to the PCI bus. Examples of the engine unit 960 include a monochrome plotter, a one-drum color plotter, a four-drum color plotter, a scanner, and a facsimile unit. The engine unit 960 includes, in addition to so-called an engine unit such as the plotter, an image processing unit that performs error diffusion, gamma conversion, and the like.

The controller 910 includes a CPU 911, a north bridge (NB) 913, a system memory (MEM-P) 912, a south bridge (SB) 914, local memory (MEM-C) 917, an ASIC 916, and an HDD 918, where an accelerated graphics port (AGP) bus 915 connects the NB 913 with the ASIC 916. The MEM-P 912 further includes ROM 912*a* and RAM 912*b*.

The CPU 911 controls the overall MFP and includes a chipset that includes the NB 913, the MEM-P 912, and the SB 914. The CPU 911 is connected to another device via the chipset.

The NB 913 is a bridge for connecting the CPU 911 to the MEM-P 912, the SB 914, and the AGP bus 915. The NB 913 includes a memory controller, a PCI master, and an AGP target. The memory controller controls reading and writing from and to the MEM-P 912.

The MEM-P 912 is a system memory used as a memory for storing program instructions and data, for uncompressing program instructions and data, for rasterization for the printer, and the like, and includes the ROM 912*a* and the RAM 912*b*. The ROM 912*a* is a read only memory for use as a memory for storing program instructions and data. The RAM 912*b* is a writable and readable memory for use as a memory for uncompressing program instructions and data, a memory for rasterization for the printer, and the like.

The SB 914 is a bridge for connecting the NB 913 to a PCI device and peripheral devices. The SB 914 is connected to the NB 913 via the PCI bus, to which a network interface (I/F) unit, or the like, is also connected.

The ASIC 916 is an integrated circuit (IC) for use in image processing. The ASIC 916 includes a hardware component for image processing and functions as a bridge that connects the AGP bus 915, the PCI bus, the HDD 918, and the MEM-C 917 to one another. The ASIC 916 includes a PCI target and an AGP master, an arbiter (ARB) which is a core of the ASIC 916, a memory controller that controls the MEM-C 917, a plurality of direct memory access controllers (DMACs) that performs image data rotation by a hardware logic or the like, and a PCI unit that transfers data between the engine unit 960 and the ASIC 916 via the PCI bus. A universal serial bus (USB) 940 and an Institute of Electrical and Electronics Engineers 1394 (the IEEE 1394) interface 950 are connected to the ASIC 916 via the PCI bus. The operating/displaying unit 920 is directly connected to the ASIC 916.

The MEM-C 917 is a local memory used as an image buffer for copying and a code buffer. The HDD 918 is a memory for accumulating image data, program instructions, font data, and forms.

The AGP bus 915 is a bus interface for a graphics accelerator card introduced to speed up graphics operations and allows direct access to the MEM-P 912 with a high throughput, thereby speeding up operations related to the graphics accelerator card.

According to an aspect of the present invention, an effect that can correct a discrepancy in magnification in the sub-scanning direction while suppressing an influence of the correction on image density is yielded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A line-head control device that controls a line head, the line-head control device comprising:
   a calculation unit that divides image data into a plurality of areas in sub-scanning direction and calculates a printing percentage for each of the plurality of areas, wherein the printing percentage for each of the plurality of areas is a ratio of black data to total data in each of the areas respectively;
   an allocation unit that allocates a total correction amount, that is a correction amount for correcting magnification of the image data in the sub-scanning direction, to the plurality of areas according to the printing percentage for each of the plurality of areas calculated by the calculation unit;
   a control unit that changes an emission period of the light emitted from the line head so as to satisfy a partial correction amount that is an allocation of the total correction amount to each of the plurality of areas, exposes the image carrier to the light emitted from the line head with the changed light emission period, thereby causing a latent image to be formed on the image carrier based on the image data; and
   a storage unit that stores a printing percentage associated with a coefficient such that a value of the coefficient decreases stepwise as a value of the printing percentage increases, wherein the allocation unit allocates the total correction amount to each of the plurality of areas with ratios according to the coefficient associated with the printing percentage calculated by the calculation unit.

2. The line-head control device according to claim 1, wherein the allocation unit ranks the areas according to the calculated printing percentages, applies ratios according to the printing percentage for each of the plurality of areas to the areas with the ranks reversed, and allocates the total correction amount to the plurality of areas with the ratios applied to each of the plurality of areas.

3. The line-head control device according to claim 1, wherein the control unit changes the light emission period evenly in the plurality of areas.

4. The line-head control device according to claim 1, wherein the control unit changes the light emission period at a predetermined interval in the plurality of areas.

5. The line-head control device according to claim 1, wherein
   the calculation unit divides each of the plurality of areas in the sub-scanning direction into a plurality of partial areas and calculates a printing percentage of each of the plurality of partial areas, and
   the allocation unit allocates the partial correction amounts to the plurality of partial areas according to the printing percentage of the partial area for each of the plurality of areas.

6. An image forming apparatus comprising:
   a line-head control device that controls a line head and that includes:
      a calculation unit that divides image data into a plurality of areas in sub-scanning direction and calculates a printing percentage for each of the plurality of areas, wherein the printing percentage for each of the plurality of areas is a ratio of black data to total data in each of the areas respectively;

an allocation unit that allocates a total correction amount, that is a correction amount for correcting magnification of the image data in the sub-scanning direction, to the plurality of areas according to the printing percentage for each of the plurality of areas calculated by the calculation unit;

a control unit that changes an emission period of the light emitted from the line head so as to satisfy a partial correction amount that is an allocation of the total correction amount to each of the plurality of areas, exposes the image carrier to the light emitted from the line head with the changed light emission period, thereby causing a latent image to be formed on the image carrier based on the image data; and a storage unit that stores a printing percentage associated with a coefficient such that a value of the coefficient decreases stepwise as a value of the printing percentage increases, wherein the allocation unit allocates the total correction amount to each of the plurality of areas with ratios according to the coefficient associated with the printing percentage calculated by the calculation unit.

7. The image forming apparatus according to claim 6, further comprising:

an image-data generating device that generates image data; and an image forming device that forms an image based on the image data, wherein the image forming device includes the calculation unit, the allocation unit, and the control unit.

8. The image forming apparatus according to claim 6, further comprising:

an image-data generating unit that generates image data; and an image forming device that forms an image based on the image data, wherein the image-data generating device includes the calculation unit, and the image forming device includes the allocation unit and the control unit.

9. A line-head control method that controls a line head, the line-head control method comprising:

calculating, by a calculation unit, a printing percentage of each of a plurality of areas, into which image data is divided in sub-scanning direction by the calculation unit, wherein the printing percentage for each of the plurality of areas is a ratio of black data to total data in each of the areas respectively;

allocating, by an allocation unit, a total correction amount, that is a correction amount for correcting magnification of the image data in the sub-scanning direction, to the plurality of areas according to each of the printing percentages calculated by the calculation unit;

controlling, by a control unit, to change an emission period of light emitted from the line head in each of the plurality of areas so as to satisfy a partial correction amount that is an allocation amount to the corresponding area, to cause an image carrier to be exposed to the light emitted by the line head with the changed light emission period, and to cause a latent image to be formed on the image carrier based on the image data; and storing, by a storage unit, a printing percentage associated with a coefficient such that a value of the coefficient decreases stepwise as a value of the printing percentage increases, wherein the allocation unit allocates the total correction amount to each of the plurality of areas with ratios according to the coefficient associated with the printing percentage calculated by the calculation unit.

* * * * *